United States Patent
Helie (10) Patent No.: US 9,798,540 B1
(45) Date of Patent: Oct. 24, 2017

(54) CLASSIFICATION OF ANOMALOUS STATIC ANALYSIS RULES

(71) Applicant: SEMMLE LIMITED, Oxford (GB)

(72) Inventor: Jean Helie, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/498,227

(22) Filed: Apr. 26, 2017

(51) Int. Cl.
  *G06F 9/44* (2006.01)
  *G06F 9/45* (2006.01)
  *G06F 11/36* (2006.01)

(52) U.S. Cl.
  CPC ............ *G06F 8/77* (2013.01); *G06F 8/42* (2013.01); *G06F 8/75* (2013.01); *G06F 11/3616* (2013.01); *G06F 11/3672* (2013.01)

(58) Field of Classification Search
  CPC ..... G06F 8/42; G06F 8/75; G06F 8/77; G06F 11/3616; G06F 11/3672
  USPC ......... 717/100–103, 105, 109, 113, 125, 143
  See application file for complete search history.

(56) References Cited

U.S. PATENT DOCUMENTS

| | | | | |
|---|---|---|---|---|
| 8,656,364 | B1 * | 2/2014 | Kolawa | G06F 8/74 717/126 |
| 2006/0225124 | A1 * | 10/2006 | Kolawa | G06F 21/6218 726/1 |
| 2015/0268939 | A1 * | 9/2015 | Kelapure | G06F 8/40 717/112 |
| 2016/0328560 | A1 * | 11/2016 | Momot | G06F 21/563 |

OTHER PUBLICATIONS

'en.wikipedia.org', "Log-normal distribution," Jan. 25, 2004, [Retrieved on Jul. 11, 2017], Retrieved from the Internet: URL<http://en.wikipedia.org/wiki/Log-normal_distribution>, 15 pages.

'en.wikipedia.org', "DBSCAN," Mar. 31, 2008, [Retrieved on Jul. 11, 2017], Retrieved from the Internet: URL<https://en.wikipedia.org/wiki/DBSCAN>, 7 pages.

'en.wilcipedia.org', "Kernel density estimation", Dec. 15, 2005, [Retrieved on Jul. 11, 2017], Retrieved from the Internet: URL<https://en.wikipedia.org/wiki/Kernel_density_estimation>, 8 pages.

* cited by examiner

Primary Examiner — Qing Chen (74) Attorney, Agent, or Firm — Fish & Richardson P.C.

(57) ABSTRACT

Methods, systems, and apparatus, including computer programs encoded on computer storage media, for automatically classifying static analysis rules as being anomalous or not. One of the methods includes receiving alerts generated by a particular static analysis rule for a plurality of different software projects analyzed by a static analysis system. For each project, a respective alert proportion metric value is computed. Each of the plurality of different software projects is classified according to the alert proportion metric values as being one non-outlier projects or outlier projects. If more than a threshold number of projects were classified as being outlier projects for the particular static analysis rule, the particular static analysis rule is classified as an anomalous static analysis rule.

24 Claims, 7 Drawing Sheets

CLASSIFICATION OF ANOMALOUS STATIC ANALYSIS RULES

BACKGROUND

This specification relates to static analysis of computer software source code.

Static analysis refers to techniques for analyzing computer software source code without executing the source code as a computer software program.

Static analysis techniques include techniques for identifying potential problems in software projects. In this specification, the term "software project," or for brevity, a "project," is a collection of source code files organized in a particular way, e.g., in a hierarchical directory structure, with each source code file in the project having a respective path. Each project has one or more respective owners. Typically, the source code files in a project provide one or more related functionalities.

A static analysis system can analyze projects using a collection of static analysis rules, which can simply be referred to as rules. Each rule defines a different potential problem with source code in a particular programming language. Each rule specifies one or more attributes for one or more source code elements, one or more relationships between source code elements, or some combination of these. For example, a rule can specify that a potential problem exists when a function is called with an unexpected number of arguments, e.g., more arguments than a number of arguments that are specified by the definition of the function.

Static analysis rules in the collection can also define, among other things, when source code elements violate one or more coding standards. Such instances will be referred to as coding defects. Coding defects can be represented by data elements that will be referred to as violations. A static analysis system can use any appropriate set of coding standards for identifying coding defects, e.g., the NASA Jet Propulsion Laboratory institutional Coding Standard for the Java Programming Language, available at http://larslab.jpl.nasa.gov/JPL_Coding_Standard_java.pdf. The types of coding defects that a static analysis system can identify include correctness standards on coding concurrent processes, maintainability standards on eliminating duplicate code segments, readability standards on reducing code complexity, and framework standards on using code libraries, to name just a few examples.

A static analysis system can analyze the source code of a project to find instances in which source code elements satisfy rules in the collection of rules. Some static analysis systems define rules using query languages, e.g., Datalog or SQL. For example, a static analysis system can parse the source code in a project to populate a database that stores properties of source code elements in the project. A static analysis system can then use a query language to query the database to identify instances of source code elements that satisfy one or more rules.

When a rule is satisfied by one or more source code elements, a static analysis system can generate an alert. An alert is data that specifies which rule has been satisfied, which source code elements are involved, and where in the code base the implicated source code elements are located. A static analysis system can then present alerts in a user interface presentation for consumption by one or more developers of the project. The alerts guide the developers on how to improve the quality of the source code in the project, e.g., by indicating potential problems that can be fixed.

SUMMARY

This specification describes, among other things, how a static analysis system that analyzes multiple different heterogeneous projects using a collection of static analysis rules can automatically identify anomalous static analysis rules, as well as a metric that can be used as a basis for this technique.

Particular embodiments of the subject matter described in this specification can be implemented so as to realize one or more of the following advantages. A static analysis system can automatically classify static analysis rules as anomalous. This is an important capability when the number of projects and the number of rules in the system make manual inspection impossible. The density-based classification of rules as anomalous is more computationally efficient than some distribution-fitting approaches. The system can prioritize the anomalous rules so that developers can prioritize which rules to work on first. This makes the results of the static analysis easier to understand and more valuable for end users.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
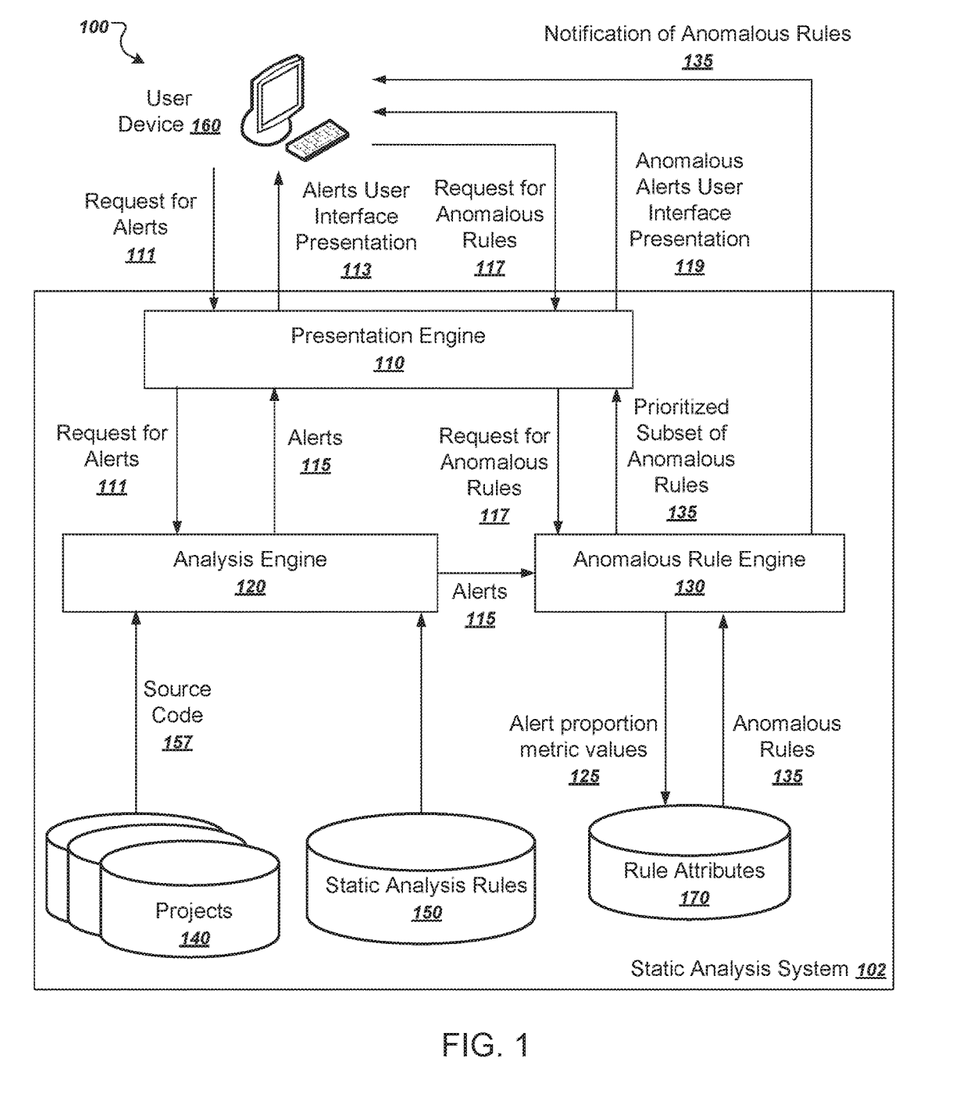
FIG. 1 is a diagram of an example system.

FIG. 1 is a diagram of an example system 100. The system 100 includes a user device 160 in communication with a static analysis system 102. The static analysis system 102 is an example system that can be implemented as a distributed, cloud-based system for performing distributed static analysis for multiple heterogeneous projects.

The static analysis system 102 includes multiple functional components, including a presentation engine 110, an analysis engine 120, and anomalous rule engine 130. These functional components of the static analysis system 102 can be implemented as computer programs installed on one or more computers in one or more locations that are coupled to each through a network. In a cloud-based static analysis system, these components can be implemented by individual computing nodes of a distributed computing system.

The static analysis system 102 also includes a number of data collections, including a collection of projects 140, a collection of static analysis rules 150, and a collection of rule attributes 170. Each of these collections can be implemented using any appropriate data storage subsystem, e.g., in a version control system or using a database. Although illustrated as being part of the static analysis system 102, these collections can also be stored by different entities. For example, one or more of the projects 140 can be stored by an online version control system.

Users can access the static analysis system 102 to obtain alerts about source code in the projects 140. Many different entities, e.g., open source teams, commercial developers, and individual users can use the static analysis system 102 to analyze projects. For example, a developer can request that the static analysis system 102 analyze a particular project in the collection of projects 140. The sheer number of many different entities and projects makes the collection of projects 140 quite heterogeneous. In other words, the collection of projects 140 can have many different projects of many different sizes, with source code written by many different authors with varying levels of coding expertise, written with many different standards and practices, and written in multiple different programming languages of different versions intended for different underlying computing platforms and operating systems.

To obtain alerts for a project, a user of user device 160 can provide a request for alerts 111 to the static analysis system. The request for alerts 111 can specify an identifier of a project in the collection of projects 140 to be analyzed. The user device 160 can communicate with the static analysis system 102 over any appropriate data communications network, e.g., one that includes an intranet, the Internet, or some combination of these.

A presentation engine 110 can receive the request for alerts 111 and forward the request 111 to an analysis engine 120. The analysis engine 120 identifies the project specified by the request 111.

The analysis engine 120 can then use the collection of static analysis rules 150 to generate alerts for the specified project. The analysis engine 120 can read the source code 157 of the particular project and use static analysis rules associated with the source code 157 to generate alerts 115. The analysis engine 120 will generally select a subset of the static analysis rules that are appropriate for the specified project. For example, the analysis engine 120 can use only rules that are intended for one or more programming languages in which the project is written.

The analysis engine 120 can provide the generated alerts 115 back to the presentation engine 110, which generates a user interface presentation 113, e.g., a web page, that lists one or more of the alerts 115. The presentation engine 110 can then provide the user interface presentation 113 back to the user device 160. In some implementations, the analysis engine 120 or the presentation engine 110 or both can filter the alerts, 115, rank the alerts 115, or both, so that only a subset of the alerts 115 generated by the analysis engine 120 end up appealing in the user interface presentation 113 that is provided back to the user device 160.

Because of the volume and heterogeneity of the projects 140, any centralized collection of static analysis rules is bound to have rules that generate anomalous alerts for one or more projects. Anomalous alerts are alerts that are generally unhelpful for the end users.

Anomalous alerts commonly manifest as false positives and overly voluminous alerts. False positives are alerts that indicate a source code problem when none actually exists, and overly voluminous alerts are alerts that unhelpfully overwhelm other alerts that are generated for the project. Overly voluminous alerts may also be false positives, but need not be.

Anomalous alerts have two primary causes. The first cause is when the static analysis rule that generated the anomalous alerts is defined incorrectly. For example, a rule can contain an error that results in the analysis generating overly voluminous results, false positives, or both, for some projects. A second cause is when the source code of a particular project itself is anomalous. In that case, a correctly defined rule could still overwhelm the alerts provided for the project. In either case, corrective action can be helpful so that the user interface presentation 113 is not dominated by unhelpful alerts.

Thus, a primary goal for the static analysis system 102 is to identify which static analysis rules are anomalous by virtue of generating anomalous alerts. The static analysis system 102 can analyze the rules in the collection of static analysis rules 150 and designate some of the rules as anomalous rules for which corrective action can be taken.

What corrective action is appropriate depends largely on the cause of the anomaly. Thus, the system can automatically generate a notification of an anomalous rule 135, which maintainers of the collection of static analysis rules 150, developers of a particular project, or both, can examine to determine an appropriate corrective action. If the rule itself is incorrect, the maintainers of the collection of static analysis rules 150 can use the notification 135 to modify the rule appropriately. If instead it turns out that the project itself is incorrect, the developers of the project can use the notification to fix the source code in the project. Alternatively or in addition, the rule can simply be disabled as unhelpful by the maintainers of the collection of static analysis rules or developers of the project.

Detecting the anomalous rules in the first instance involves an automatic classification process. This is because the sheer volume and heterogeneity of projects as well as the sheer volume of rules that a static analysis system processes makes manual inspection and testing for all rules for all projects infeasible.

An appropriate metric for detecting anomalous rules must be selected carefully. Two metrics that have proven to be insufficient are (1) a total number of alerts and (2) an alerts density.

Using a total number of alerts as an anomalous rule metric is insufficient because the total number of alerts generated by a rule has a strong correlation with the number of lines of code in a project. Therefore, very large projects will tend to result in rules generating many more alerts than small projects. Thus, the raw number of alerts itself is not a sufficiently informative anomalous rule metric.

Using an alerts density is also insufficient. The alerts density is the number of alerts generated by a rule divided by the number of lines of code in a project. The alerts density is insufficient because it does not indicate whether or not a rule generating anomalous results is actually any different from any other rule in the project. This is often the case for projects having low quality generally. If the entire project has consistently low quality, it's possible that multiple perfectly correct rules will still generate an overwhelming number of alerts. This is not helpful because the goal is either to investigate whether a given rule is triggered in an unexpected way by the project, e.g., false positives; or, if the results are true positives, to be able to provide corrective action recommendations to the project developers.

Instead, the system can use an alert proportion metric that defines, for a particular rule, a score representing a proportion of all alerts generated by the particular rule for each of one or more projects. Thus, each rule will be associated with multiple alert proportion metric values, one value for each of one or more projects against which the rule has been run. Each alert proportion metric value for a rule represents, for a respective project, what proportion of the alerts for the project were generated by the rule. The proportion can be expressed using any appropriate value for representing a proportion, e.g., a percentage, a decimal, or a scaled or normalized value.

As shown in FIG. 1, the anomalous rule engine 130 can receive alerts 115 generated by the analysis engine 120 and compute alert proportion metric values 125. The alert proportion metric values 125 indicate, for each rule used to analyze a particular project, what proportion of all alerts for the particular project were generated from the rule. The anomalous rule engine 130 can then associate, for each rule in a collection of rule attributes 170, a respective alert proportion metric value for each project for which the rule has been used.

The anomalous rule engine 130 can also use the alert proportion metric values 125 to classify some rules as being anomalous rules. Techniques for using the alert proportion metric values to automatically detect anomalous rules are described in more detail below. In general, the anomalous rule engine 130 associates with each rule in the collection of rule attributes whether or not the rule is classified as an anomalous rule.

The anomalous rule engine 130 can also compute a relative number of anomalous projects over time for each rule. This information can indicate the intrinsic reliability of a rule and can be used to inform a general static analysis results ranking system. For example, some rules may intrinsically be less reliable in the sense that they are prone to generate more anomalous results regardless of how they are improved. The system can use this information to compute a rule reliability metric, which can be used to rank static analysis results generally.

A user of user device 160 can submit to the static analysis system 102 a request for anomalous rules 117, which can be a request for one or more anomalous rules for a particular project. The request for anomalous rules 117 can be submitted by a maintainer of the static analysis system or by a developer of the particular project. The request for anomalous rules 117 is received by the presentation engine 110 and forwarded to the anomalous rule engine 130.

The anomalous rule engine 130 can obtain the anomalous rules 135 for the specified project and can generate a prioritized subset of anomalous rules 135. The prioritized subset of anomalous rules 135 assigns a measure of priority to each of the anomalous rules for the project. The anomalous rule engine 130 can generate the prioritized subset of anomalous rules 135 by scoring, filtering, and ranking anomalous rules for the project. This process is described in more detail below with reference to FIG. 5.

The anomalous rules engine 130 can precompute some or all of the anomalous rules for one or more of the projects 140 that are analyzed by the static analysis system 102. The the anomalous rules engine 130 can then use the precomputed anomalous rules to analyze one or more other projects after the request 117 is received. For example, a user at a particular customer site can request that the static analysis system 102 analyze one or more on-premises projects that are locally maintained. The static analysis system 102 can them compute alert proportion metric values for the on-premises projects to determine which of the on-premises projects have anomalous rules according to the analyzed projects 140 that are maintained by the static analysis system 102.

The presentation engine 110 can then generate an anomalous alerts user interface presentation 119. The anomalous alerts user interface presentation 119 can list one or more anomalous rules for the project, in addition to other information, e.g., a score or a priority level for each anomalous rule. The presentation engine 110 can also generate a user interface presentation 119 that presents the relative number of anomalous projects over time for each rule, as well as a rule reliability metric computed from this information.

The presentation engine can then provide the anomalous alerts user interface presentation 119 back to the user device 160. A user of the user device 160, a maintainer of the static analysis system 102 or a developer of a project, can use the anomalous alerts user interface presentation 119 to prioritize how to take corrective action for anomalous rules of the project.

Alternatively or in addition, the anomalous rule engine 130 can use the collection of rule attributes 170 to automatically generate notifications 135 of anomalous rules for multiple projects in the system. For example, the anomalous rule engine 130 can automatically analyze the rules on a periodic basis, e.g., daily, weekly, or monthly, to name just a few examples.

The notification 135 of an anomalous rule can be provided to the user device 160 for action by a maintainer of the static analysis system, to a developer of the project, or both, e.g., as an email message or an application notification. The recipient of the notification can then examine the anomalous rule and take an appropriate corrective action, as described above.

Figure 2:
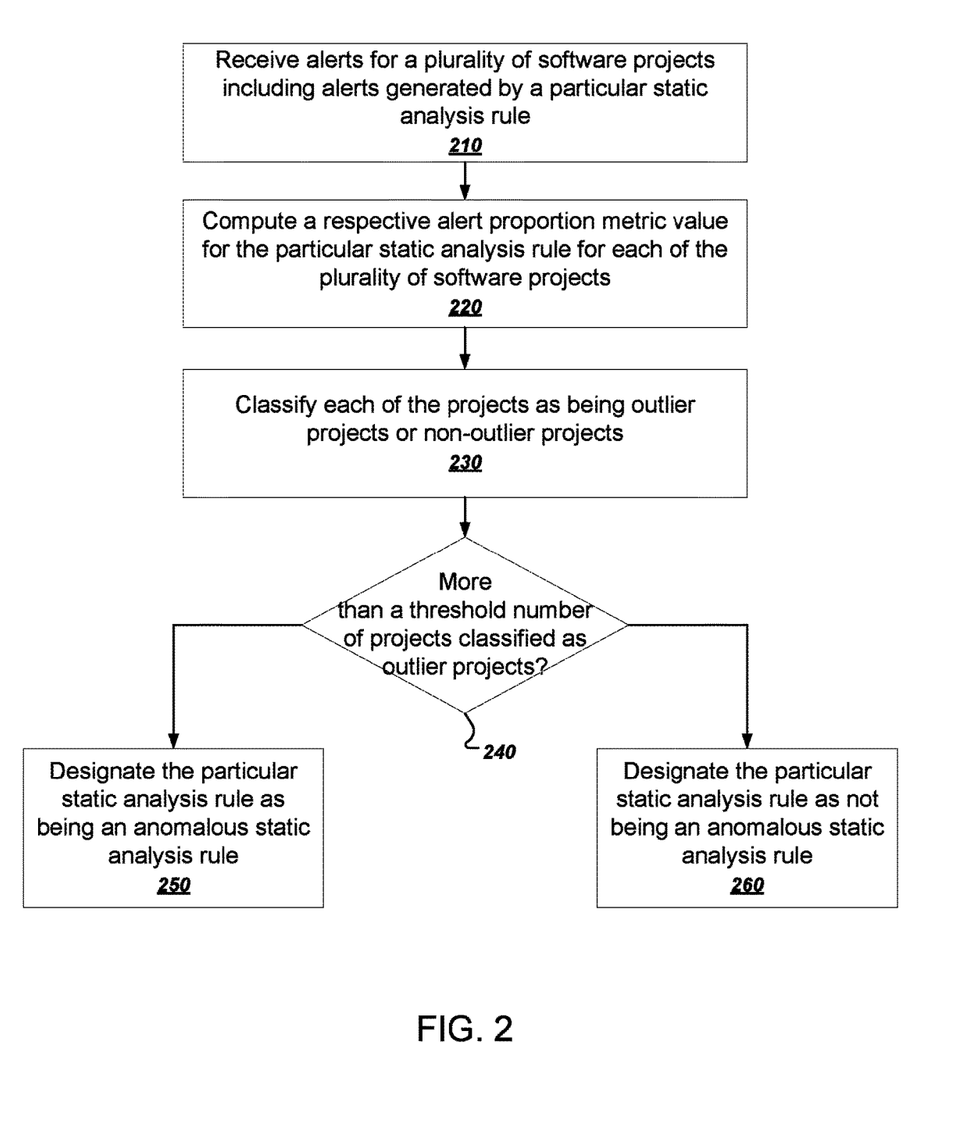
FIG. 2 is a flow chart of an example process for automatically determining whether a particular static analysis rule is anomalous.

FIG. 2 is a flow chart of an example process for automatically determining whether a particular static analysis rule is anomalous. In general, the system uses a density-based classification process to classify projects as being outliers or not. The process can be implemented by one or more computer programs installed on one or more computers. The process will be described as being performed by a system of one or more computers, e.g. the static analysis system 102 of FIG. 1.

The system receives alerts for a plurality of software projects including alerts generated by a particular static analysis rule (210). The system can regularly analyze the rules in a collection of static analysis rules to determine if any rules are anomalous. Alternatively or in addition, the system can receive a user request to determine whether or not the particular static analysis rule is anomalous.

The system can analyze alerts for each of one or more projects against which the rule was executed. In some implementations, the system filters out projects for which there is insufficient data. For example, the system can filter out projects having fewer than a threshold number of alerts, e.g., 5, 50, or 500 alerts. Alternatively or in addition, the system can also filter out alerts for projects based on a minimum number of lines of code for the project or a minimum number of rules that trigger alerts for the project.

The system can also decline to perform anomaly detection for rules that are likely not to have enough associated data. In some implementations, the system declines to perform anomaly detection for rules that were not executed for enough projects. The system can set a threshold minimum for a number of different projects that have used the rule, e.g., 5, projects, 50 projects, or 100 projects. If the number of projects that have used the rule is fewer than the threshold, the system can decline to perform the result of the anomaly detection process and move on to a next rule, if the system is performing anomaly detection for multiple rules.

The system computes an alert proportion metric value for the particular static analysis rule for each of the plurality of software projects (220). As described above, each alert proportion metric value represents the proportion of all alerts for a particular project that were generated by the particular static analysis rule. In other words, if 75% of all alerts for a particular project were generated by one particular static analysis rule, the alert proportion metric value for that rule and that project can represent this value.

In some implementations, the system filters out projects that have zero alerts for the given rule. The reason for this is that most rules trigger alerts in only a relatively small number of projects, typically only between 20% and 40% of the projects. In other words, most projects for most rules would have an alert proportion metric value of zero. In addition, the value N for the number of neighbors used by the density-based classification process is informed by the number of neighbors that each point has in the dataset. If a large number of projects are clustered at zero, the value of N can be inflated and dictated by an uninteresting segment of the dataset.

The system classifies each of the projects as being outlier projects or non-outlier projects (230). The system effectively performs a density-based classification process that uses the alert proportion metric value as a distance metric.

Non-outlier projects include both core projects and density-reachable projects Core projects are projects having at least a threshold number of neighbors within a particular search radius according to the alert proportion metric values. Density-reachable projects are projects having at least one neighbor within the search radius that is a core project, but having fewer than the threshold number of neighbors within the search radius.

Finally, outlier projects are those projects having no neighbors within the search radius that are core projects and having fewer than the threshold number of neighbors within the search radius.

The value used for the threshold number of neighbors and the search radius will greatly affect the outcome of the classification. A method for choosing an appropriate threshold number of neighbors is described in more detail below with reference to FIG. 4.

The search radius can be set as a particular fixed portion of the space of alert proportion metric values. Generally, a search radius that covers less than 10% of the space of alert proportion metric values provides sufficient performance. Having a smaller search radius introduces more precision but increases the chances of false positive detections. On the other hand, having a larger search radius reduces precision but also reduces the chances of false positives.

The system can use any appropriate iterative clustering technique to classify these points into these three groups. In some implementations, the system classifies the projects into these groups using the density-based spatial clustering of applications with noise algorithm (DBSCAN).

The system can also simplify the processing of the results without a significant loss of accuracy by classifying, as outliers, any projects having an alert proportion metric value that is higher than any other project classified as an outlier. In other words, once any project is classified as an outlier, all other projects having higher alert proportion metric values can also be classified as outliers. This is because in some data sets, multimodal distributions are empirically rare. This also allows the system to remove some noise in the results due to relatively small clusters around large alert proportion metric values. This shortcut also simplifies the interpretation of the results.

The system determines whether more than a threshold number of projects are classified as outlier projects (240). If so, the system designates the particular static analysis rule as being an anomalous static analysis rule (branch to 250). In some implementations, the system considers any static analysis rule that resulted in any outliers as being an anomalous static analysis rule. As part of the designation of the static analysis rule as being anomalous, the system can generate an automatic notification for maintainers of the rules or for developers of one or more of the outlier projects.

If fewer than the threshold number of projects are classified as being outlier projects, the system designates the particular static analysis rule as not being an anomalous static analysis rule (branch to 260). The rationale is that good static analysis rules will not result in any outlier projects, but bad static analysis rules will.

FIGS. 3A-3F illustrate an example of designating one or more static analysis rules as anomalous. These figures illustrate how the density-based classification overcomes problems with using distributions to classify rules as anomalous.

Figure 3A:
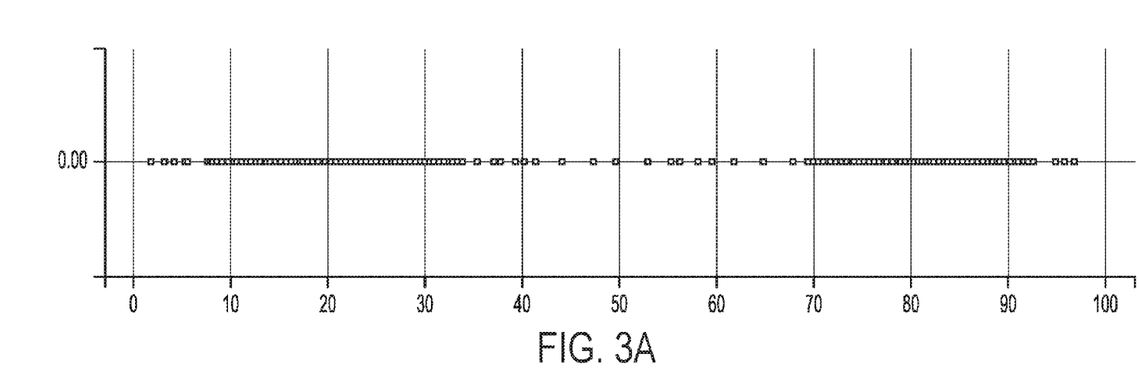
FIG. 3A illustrates alert proportion metric values for a single rule for 650 different projects.

FIG. 3A illustrates alert proportion metric values for a single rule for 650 different projects. Each point on the axis represents the alert proportion metric value for a different project. In this graph, the alert proportion metric values are expressed as scores between 0 and 100.

Figure 3B:
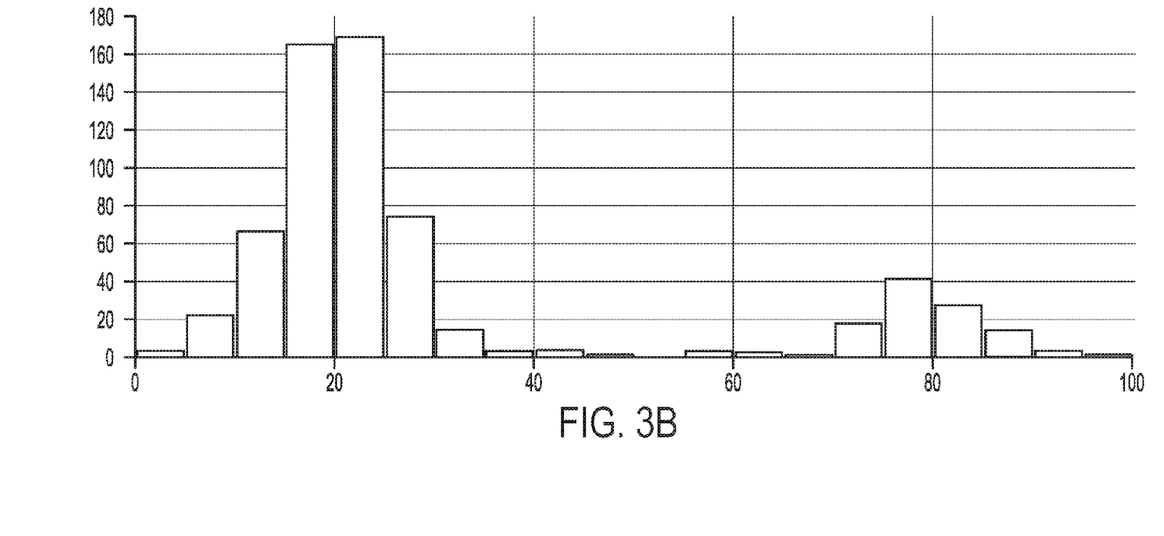
FIG. 3B is a histogram of alert proportion metric values.

FIG. 3B is a histogram of the alert proportion metric values. FIG. 3B reveals that the data for the particular rule has a bi-modal distribution, with peaks occurring at around 20 and at around 80.

Figure 3C:
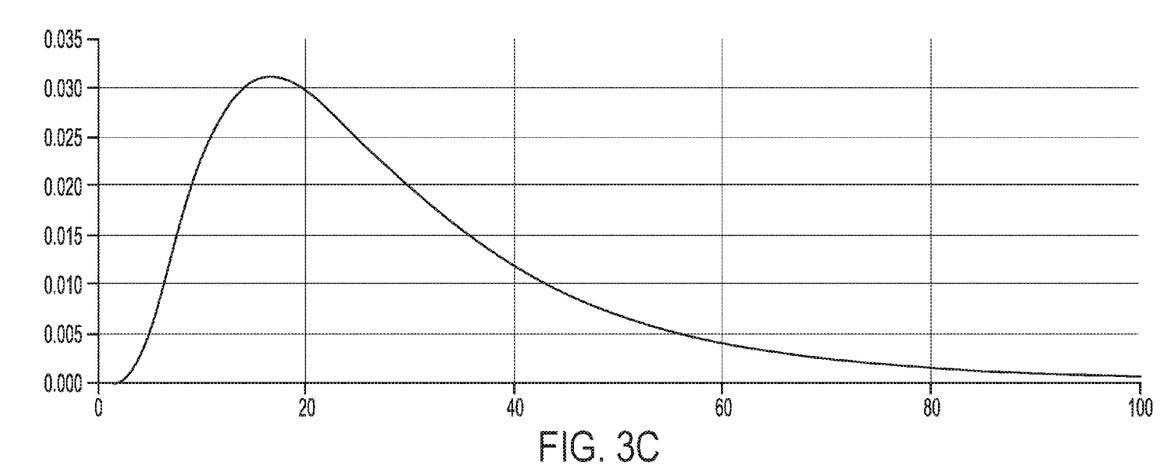
FIG. 3C illustrates a distribution fit to the alert proportion metric values

FIG. 3C illustrates a distribution fit to the alert proportion metric values. When considering all common distributions for this dataset, e.g., Laplace, normal, gamma, log-normal, chi-squared, half-normal, and uniform, the distribution that results in the best fit for this dataset is the log-normal distribution shown in FIG. 3C.

However, even though this distribution has the best fit that could be found, this distribution results in counter-intuitive results. When looking at the graph in FIG. 3C, it would seem natural to define a value around 0.005 as a cutoff for anomalous projects. The meaning of the distribution is that these are points that are predicted to have less than a 5% chance of being observed.

Figure 3D:
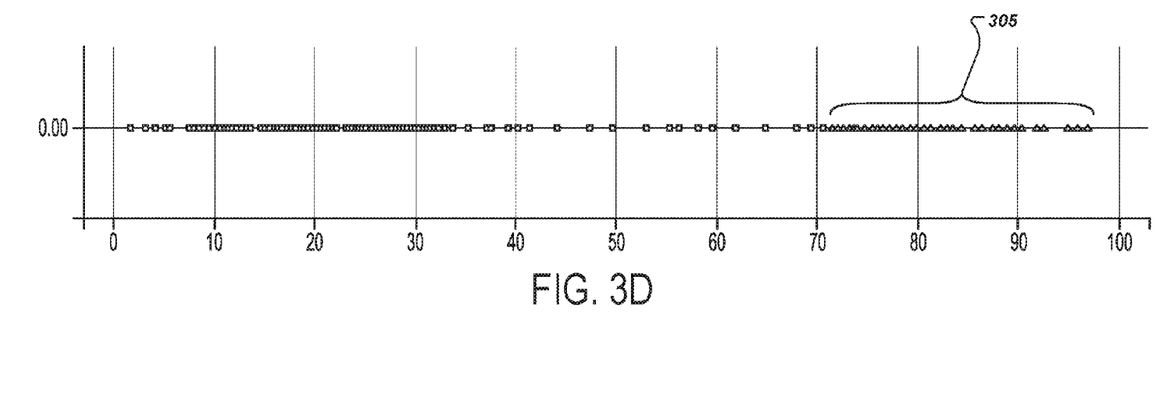
FIG. 3D illustrates projects classified using a distribution fit.

Using this criterion results in the classification shown in FIG. 3D. FIG. 3D illustrates projects classified using a distribution fit. As shown in FIG. 3I), all projects 305 having an alert proportion metric value above about 72 are classified as outliers. In this example, this is roughly 40% of all projects in the dataset.

This result is unsatisfying because the intuitive meaning of an outlier is a point which differs in a significant way from the majority of the data. But in the dataset here, that is not the case for the definition of outlier provided by the log-normal distribution.

Figure 3E:
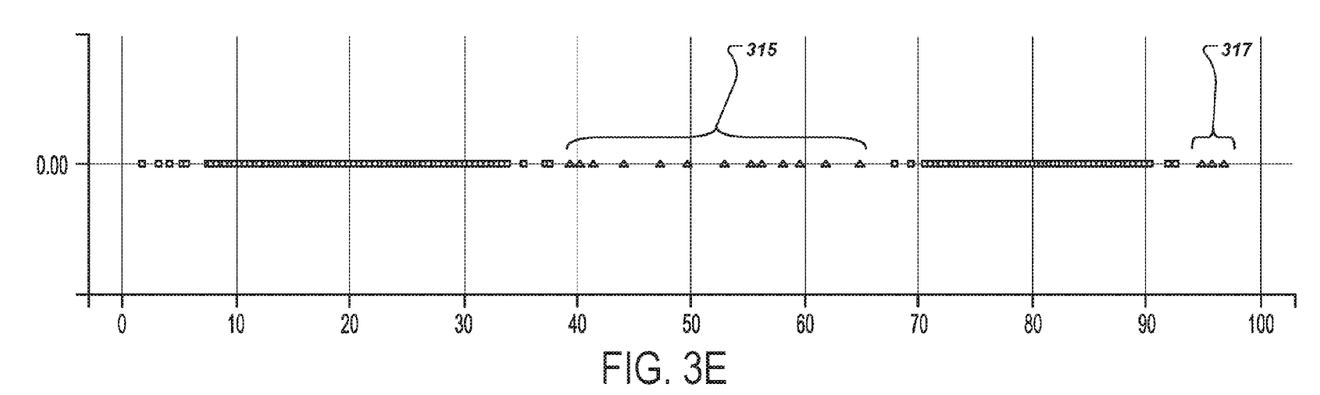
FIG. 3E illustrates projects classified using density-based classification.

FIG. 3E illustrates projects classified using density-based classification, e.g., as described above with reference to FIG. 2. FIG. 3E shows projects classified as anomalous or not. In FIG. 3E, there are two groups 315 and 317 of anomalous projects.

Figure 3F:
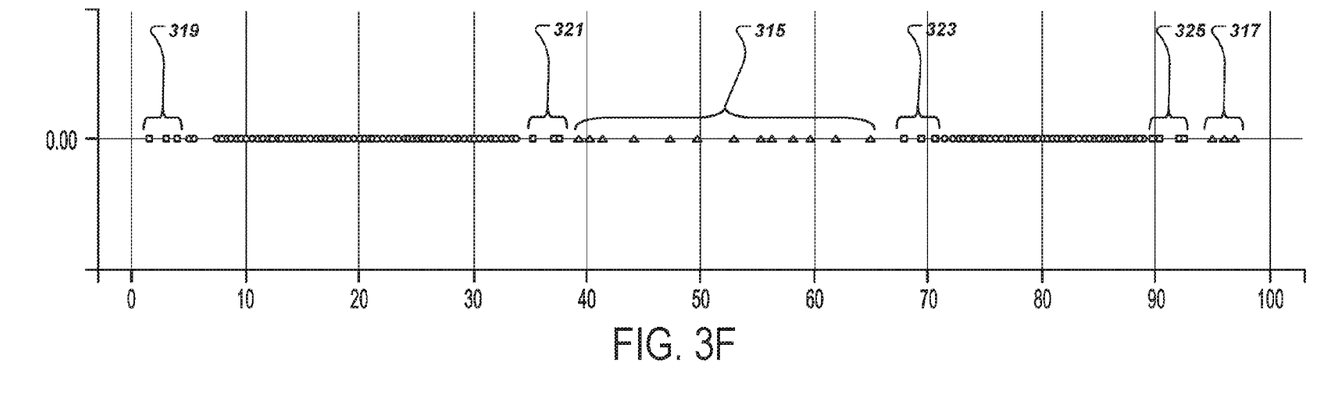
FIG. 3F illustrates which projects are considered to be core points, density-reachable points, and outliers for the same data set

FIG. 3F illustrates which projects are considered to be core points, density-reachable points, and outliers for the same data set. FIG. 3F shows the same groups 315 and 317 of outliers, as well as four groups 319, 321, 323, and 325 of density-reachable projects. The remaining points are core projects.

As these examples show, when using the density-based classification process, only about 16 projects in two groups 315 and 317 are classified as outliers, which is a much more intuitive result according to the data. In particular, points having alert proportion metric values between 40 and 60 (corresponding to group 315) are outliers because they differ significantly from a majority of the data. This is information that cannot be gained from a distribution for this dataset.

In the general case, although techniques for distribution fitting could in theory deal more effectively with non-unimodality, these techniques have drawbacks that are unsuitable for this problem. First, mixture model approaches require prior assumptions regarding the constituting distributions of the sub-populations. However, the heterogenous nature of the different projects renders it impossible to make such assumptions.

Second, kernel density estimation (KDE) techniques can deal with non-unimodality by building an ad-hoc distribution from a discrete dataset. However, this procedure is much more difficult to implement and is much more computationally expensive than the density-based classification procedure described above. Furthermore, the KDE approach lacks the notion of density-reachable points and thus tends to report these points as outliers, which introduces more noise in the results.

In addition, the density-based clustering approach described above has a fundamental advantage of applying the same outlier logic to different datasets corresponding to different static analysis rules. If instead, the best-fit distributions were used for each rule, different rules would have different distributions with different qualities of fits. This would result in a corresponding difference in the quality of the outlier detection for each rule. And these differences are a real problem for a system having a goal of taking an action based on how bad an outlier is.

In contrast, the density-based classification approach uses the same logic for all rules. Therefore, the quality of the outlier detection for all rules is much more similar compared to any of the distribution-based approaches.

Figure 4:
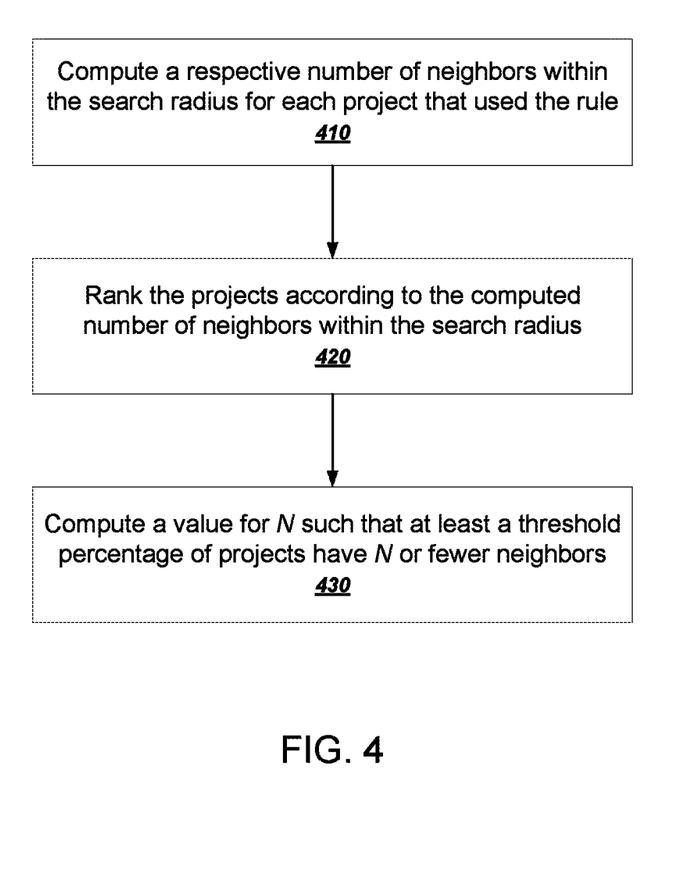
FIG. 4 is a flow chart of an example process for choosing a threshold number N of neighbors to be used for density-based classification of a static analysis rule.

FIG. 4 is a flow chart of an example process for choosing a threshold number N of neighbors to be used for density-based classification of a static analysis rule. As described above with reference to FIG. 2, the density-based classification process takes as input a threshold number N of neighbors for projects to be considered core projects or density-reachable projects. This example process provides a way to choose N so as to adjust the process to how the data is distributed. This gives the benefit of being able to adjust to the distribution of the data but without facing the difficulties described above of actually fitting a distribution. The process can be implemented by one or more computer programs installed on one or more computers. The process will be described as being performed by a system of one or more computers, e.g. the static analysis system 102 of FIG. 1.

The system computes a respective number of neighbors within the search radius for each project that used the rule (410). In other words, the system determines for each project how many other projects have alert proportion metric values that are within a particular search radius.

The system ranks the projects by the respective number of neighbors within the search radius (420). For example, the system can rank the projects from those that have the most neighbors to those that have the least neighbors.

The system computes a value for N such that at least a threshold percentage of projects have N or fewer neighbors (430). In other words, the system chooses a value for N such that at least a particular percentage of projects have fewer neighbors than the chosen value for N. The system can use any appropriate value for the threshold percentage, 5%, 10% or 15%. For example, if using 10%, the system can choose a value for N such that no more than 10% of the projects have N or fewer neighbors. In some implementations, the system also imposes an absolute minimum value on the threshold, e.g., a minimum of 3, 5, or 10 neighbors.

After computing the value of N for the rule, the system can perform a density-based classification process, e.g., as described above with reference to FIG. 2.

Figure 5:
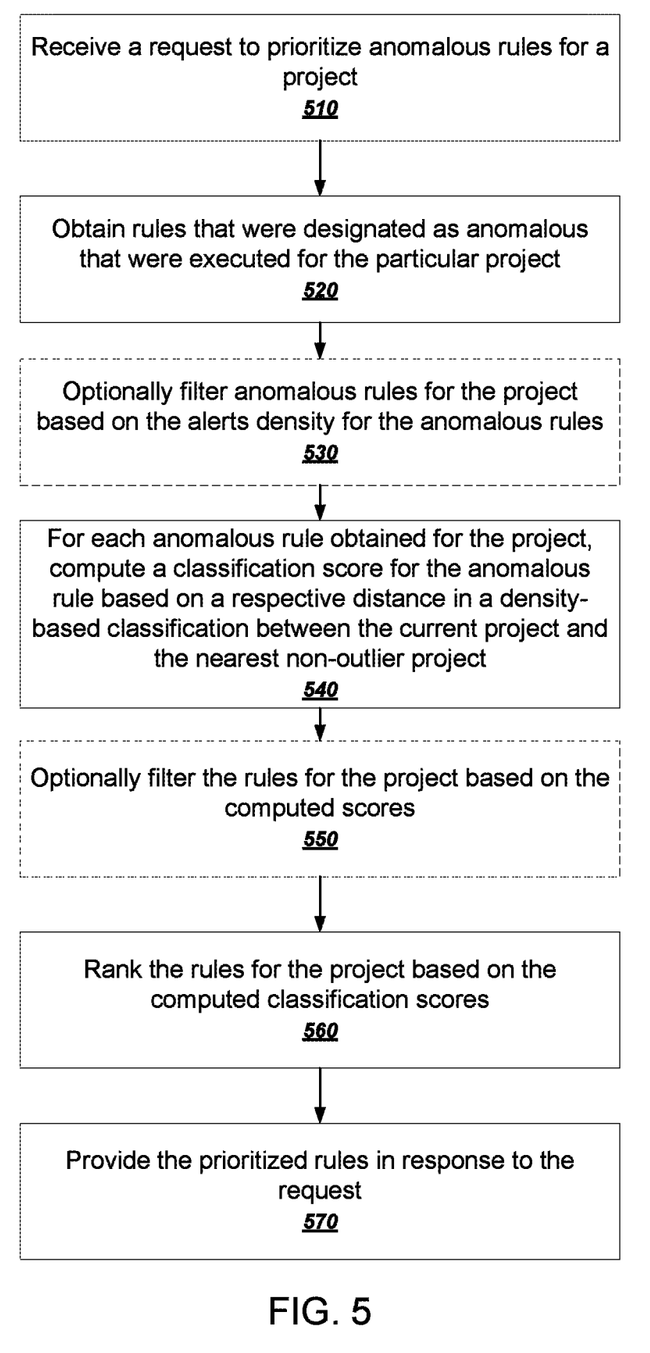
FIG. 5 is a flow chart of an example process for ranking anomalous rules.

FIG. 5 is a flow chart of an example process for ranking anomalous rules. The system can prioritize rules that have been designated as outliers for a particular project so that maintainers of the rules, project developers, or both can prioritize their corrective actions. The process can be implemented by one or more computer programs installed on one or more computers. The process will be described as being performed by a system of one or more computers, e.g. the static analysis system 102 of FIG. 1.

The system receives a request to prioritize anomalous rules for a project (510). The request can be explicitly initiated by maintainers of the static analysis rules or by developers for the project. Alternatively, the system can automatically generate the request periodically so that the static analysis rules are periodically prioritized for each project analyzed by the system.

The system obtains rules executed for the project that were designated as anomalous (520). As described above, the system can obtain rules that were designated as outliers in the density-based classification process.

The system can optionally filter the anomalous rules for the project based on the alerts density for the anomalous rules (530). In other words, the system can filter out rules not having a sufficiently high alerts density for the project. The rationale for doing so is that even if a rule is a strong outlier from the classification process, the rule may account for a fairly small number of alerts if the project has excellent quality overall. Therefore, the system can filter out rules that have less than a threshold alerts density.

The system can use a predetermined alerts density threshold, or the system can compute the alerts density threshold dynamically for each rule. For example, the system can compute the alerts density threshold to correspond to a particular alerts density percentile, e.g., the 5th, 10th, or 15th alerts density percentile.

For each anomalous rule obtained for the project, the system computes a classification score for the anomalous rule based on the distance in the density-based classification between the current project and the nearest non-outlier project (540). The rationale for the scoring is that the worst anomalous rules tend to be those rules that are the most different from every other project. Thus, the system can consider rules that are the farthest away from any other project to be anomalous rules having the most significance and thus the highest priority.

This means that the system can use different density-based classification results for each rule to compute a classification score for the rule. Therefore, the subset of projects against which each rule is compared need not be the same. For example, one rule for the project can have a classification score based on a distance to a first non-outlier project, and another rule for the project can have a classification score based on a distance to a different second non-outlier project. The non-outlier projects can be either a core project or a density-reachable project according to the density-based classification process.

The system can also compute a combined score for the anomalous rule that is based on the classification score and an alerts density score for the rule. The alerts density score represents the significance of a rule to a project based on the alerts density of the rule. Thus, a greater alerts density will result in an alerts density score that indicates a greater significance of the rule to the project. In some implementations, the system computes an alerts density score by computing a distance between the threshold alerts density and the alerts density for a rule. A greater alerts density score from a greater distance thus represents a rule having more significance to the project, while a lesser alerts density score from a lesser distance represents a rule having less significance to the project.

The system can then compute a combined score for each rule using the classification score and the alerts density score. The system can use any appropriate technique for computing a combined score from the classification score and the alerts density score. For example, the system can assign weights to each score and compute a weighted sum or product of the classification score and the alerts density score. The system can also compute a rule rank for each of the classification score and alerts density score and then compute a final rank based on a combination, e.g., a sum or an average, of the respective ranks.

The system optionally filters the rules based on the computed scores (550). The system can filter rules based on the classification score, the combined score, or both. For example, in some cases, it may be useful to ignore rules whose projects were on the borderline between being outliers and being density-reachable. Thus, in order to highlight the most significant anomalous rules, the system can filter out rules having classification scores below a particular threshold score.

The system ranks the rules for the project based on the computed classification scores (550). The system can rank the rules using either the classification scores alone or using a combined score that also considers the alerts density score, as described above.

The system provides the prioritized rules in response to the request (570). The system can, e.g., provide a user interface presentation that presents the prioritized anomalous rules. The system can provide the user interface presentation to a maintainer of the static analysis rules, to a developer of the project, or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (UPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments and the embodiments described above, the following embodiments are also innovative:

Embodiment 1 is a method comprising:
  receiving alerts generated by a plurality of different static analysis rules for a plurality of different software projects analyzed by a static analysis system, including alerts generated by a particular static analysis rule, wherein each alert represents a potential occurring in a particular software project;
  computing, for each project, a respective alert proportion metric value, the alert proportion metric value representing a proportion of alerts generated by the particular static analysis rule for the project relative to all other alerts generated by one or more other static analysis rules executed for the project;
  classifying each of the plurality of different software projects according to the alert proportion metric values as being one of (1) non-outlier projects, or (2) outlier projects, the outlier projects being projects having fewer than a threshold number of neighbors within a particular search radius and having no neighbors that are non-outlier projects;
  determining that more than a threshold number of projects were classified as being outlier projects for the particular static analysis rule; and
  in response, designating the particular static analysis rule as an anomalous static analysis rule.

Embodiment 2 is the method of embodiment 1, wherein the non-outlier projects include:
  (1) core projects, having at least a threshold number of neighbors within the particular search radius, and
  (2) density-reachable projects having at least one neighbor within the particular search radius that is a core point and fewer than the threshold number of neighbors within the particular search radius.

Embodiment 3 is the method of any one of embodiments 1-2, further comprising:
  receiving a request to prioritize anomalous rules for a particular project;
  computing, for each anomalous rule for the particular project, a respective score, wherein the score is based on a distance between the particular project and a nearest non-outlier project in classification results for the anomalous rule; and
  ranking the anomalous rules for the particular project based on the respective score for each anomalous rule.

Embodiment 4 is the method of embodiment 3, further comprising:
  computing a respective alerts density score for each rule; and
  filtering out rules having an alerts density score that does not satisfy a threshold alerts density score.

Embodiment 5 is the method of embodiment 3, further comprising filtering out anomalous rules having a score that satisfies a threshold.

Embodiment 6 is the method of any one of embodiments 1-5, further comprising computing the threshold number of neighbors for the particular static analysis rule, comprising:

computing a respective number of neighbors within the particular search radius for each project on which the rule was executed;

ranking the projects on which the rule was executed according to the computed number of neighbors within the particular search radius; and computing a value N for the threshold number of neighbors such that at least a threshold percentage of the projects have N or fewer neighbors.

Embodiment 7 is the method of any one of embodiments 1-6, further comprising:

generating an automatic notification of the anomalous static analysis rule; and providing the automatic notification to a maintainer of static analysis rules for the static analysis system or to a developer of a particular project.

Embodiment 8 is the method of any one of embodiments 1-7, further comprising automatically disabling the particular static analysis rule.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:

automatically receiving alerts generated by a plurality of different static analysis rules for a plurality of different software projects analyzed by a static analysis system, including alerts generated by a particular static analysis rule, wherein each alert represents a potential problem occurring in a particular software project;

automatically computing, for each different software project of the plurality of different software projects, a respective alert proportion metric value, wherein the respective alert proportion metric value represents a proportion of alerts generated by the particular static analysis rule for the particular software project relative to all other alerts generated by one or more other static analysis rules executed for the particular software project;

automatically classifying each different software project of the plurality of different software projects according to the alert proportion metric values as being one of (1) non-outlier projects, or (2) outlier projects, wherein the outlier projects include projects having fewer than a threshold number of neighbors within a particular search radius and having no neighbors that are non-outlier projects;

automatically determining that more than a threshold number of projects were classified as being outlier projects for the particular static analysis rule; and in response to determining that more than the threshold number of projects were classified as being outlier projects for the particular static analysis rule, automatically designating the particular static analysis rule as an anomalous static analysis rule.

2. The computer-implemented method of claim 1, wherein the non-outlier projects include:

(1) core projects having at least a threshold number of neighbors within the particular search radius, and (2) density-reachable projects having at least one neighbor within the particular search radius that is a core point and having fewer than the threshold number of neighbors within the particular search radius.

3. The computer-implemented method of claim 1, further comprising:

automatically receiving a request to prioritize anomalous static analysis rules for a particular software project;

automatically computing, for each anomalous static analysis rule for the particular software project, a respective score, wherein the respective score is based on a distance between the particular software project and a nearest non-outlier project in classification results for the anomalous static analysis rule for the particular software project; and automatically ranking the anomalous static analysis rules for the particular software project based on the respective score for each anomalous static analysis rule for the particular software project.

4. The computer-implemented method of claim 3, further comprising:

automatically computing a respective alerts density score for each anomalous static analysis rule for the particular software project; and automatically filtering out the anomalous static analysis rules for the particular software project having an alerts density score that does not satisfy a threshold alerts density score.

5. The computer-implemented method of claim 3, further comprising automatically filtering out the anomalous static analysis rules for the particular software project having an alerts density score that satisfies a threshold alerts density score.

6. The computer-implemented method of claim 1, further comprising computing the threshold number of neighbors for the particular static analysis rule, comprising:
automatically computing a respective number of neighbors within the particular search radius for each different software project of the plurality of different software projects on which the particular static analysis rule was executed;
automatically ranking the plurality of different software projects on which the particular static analysis rule was executed according to the computed respective number of neighbors within the particular search radius; and
automatically computing a value N for the threshold number of neighbors such that at least a threshold percentage of the plurality of different software projects have N or fewer neighbors.

7. The computer-implemented method of claim 1, further comprising:
automatically generating an automatic notification of the anomalous static analysis rule; and
automatically providing the automatic notification of the anomalous static analysis rule to a maintainer of the plurality of different static analysis rules for the static analysis system or to a developer of the particular software project.

8. The computer-implemented method of claim 1, further comprising automatically disabling the particular static analysis rule.

9. A system comprising:
one or more computers and one or more storage devices storing instructions that are operable, when executed by the one or more computers, to cause the one or more computers to perform operations comprising:
automatically receiving alerts generated by a plurality of different static analysis rules for a plurality of different software projects analyzed by a static analysis system, including alerts generated by a particular static analysis rule, wherein each alert represents a potential problem occurring in a particular software project;
automatically computing, for each different software project of the plurality of different software projects, a respective alert proportion metric value, wherein the respective alert proportion metric value represents a proportion of alerts generated by the particular static analysis rule for the particular software project relative to all other alerts generated by one or more other static analysis rules executed for the particular software project;
automatically classifying each different software project of the plurality of different software projects according to the alert proportion metric values as being one of (1) non-outlier projects, or (2) outlier projects, wherein the outlier projects include projects having fewer than a threshold number of neighbors within a particular search radius and having no neighbors that are non-outlier projects;

automatically determining that more than a threshold number of projects were classified as being outlier projects for the particular static analysis rule; and
in response to determining that more than the threshold number of projects were classified as being outlier projects for the particular static analysis rule, automatically designating the particular static analysis rule as an anomalous static analysis rule.

10. The system of claim 9, wherein the non-outlier projects include:
(1) core projects having at least a threshold number of neighbors within the particular search radius, and
(2) density-reachable projects having at least one neighbor within the particular search radius that is a core point and having fewer than the threshold number of neighbors within the particular search radius.

11. The system of claim 9, wherein the operations further comprise:
automatically receiving a request to prioritize anomalous static analysis rules for a particular software project;
automatically computing, for each anomalous static analysis rule for the particular software project, a respective score, wherein the respective score is based on a distance between the particular software project and a nearest non-outlier project in classification results for the anomalous static analysis rule for the particular software project; and
automatically ranking the anomalous static analysis rules for the particular software project based on the respective score for each anomalous static analysis rule for the particular software project.

12. The system of claim 11, wherein the operations further comprise:
automatically computing a respective alerts density score for each anomalous static analysis rule for the particular software project; and
automatically filtering out the anomalous static analysis rules for the particular software project having an alerts density score that does not satisfy a threshold alerts density score.

13. The system of claim 11, wherein the operations further comprise automatically filtering out the anomalous static analysis rules for the particular software project having an alerts density score that satisfies a threshold alerts density score.

14. The system of claim 9, wherein the operations further comprise computing the threshold number of neighbors for the particular static analysis rule, comprising:
automatically computing a respective number of neighbors within the particular search radius for each different software project of the plurality of different software projects on which the particular static analysis rule was executed;
automatically ranking the plurality of different software projects on which the particular static analysis rule was executed according to the computed respective number of neighbors within the particular search radius; and
automatically computing a value N for the threshold number of neighbors such that at least a threshold percentage of the plurality of different software projects have N or fewer neighbors.

15. The system of claim 9, wherein the operations further comprise:
automatically generating an automatic notification of the anomalous static analysis rule; and
automatically providing the automatic notification of the anomalous static analysis rule to a maintainer of the plurality of different static analysis rules for the static analysis system or to a developer of the particular software project.

16. The system of claim 9, wherein the operations further comprise automatically disabling the particular static analysis rule.

17. A computer program product, encoded on one or more non-transitory computer storage media, comprising instructions that when executed by one or more computers cause the one or more computers to perform operations comprising:

automatically receiving alerts generated by a plurality of different static analysis rules for a plurality of different software projects analyzed by a static analysis system, including alerts generated by a particular static analysis rule, wherein each alert represents a potential problem occurring in a particular software project;

automatically computing, for each different software project of the plurality of different software projects, a respective alert proportion metric value, wherein the respective alert proportion metric value represents a proportion of alerts generated by the particular static analysis rule for the particular software project relative to all other alerts generated by one or more other static analysis rules executed for the particular software project;

automatically classifying each different software project of the plurality of different software projects according to the alert proportion metric values as being one of (1) non-outlier projects, or (2) outlier projects, wherein the outlier projects include projects having fewer than a threshold number of neighbors within a particular search radius and having no neighbors that are non-outlier projects;

automatically determining that more than a threshold number of projects were classified as being outlier projects for the particular static analysis rule; and in response to determining that more than the threshold number of projects were classified as being outlier projects for the particular static analysis rule, automatically designating the particular static analysis rule as an anomalous static analysis rule.

18. The computer program product of claim 17, wherein the non-outlier projects include:
(1) core projects having at least a threshold number of neighbors within the particular search radius, and
(2) density-reachable projects having at least one neighbor within the particular search radius that is a core point and having fewer than the threshold number of neighbors within the particular search radius.

19. The computer program product of claim 17, wherein the operations further comprise:

automatically receiving a request to prioritize anomalous static analysis rules for a particular software project;

automatically computing, for each anomalous static analysis rule for the particular software project, a respective score, wherein the respective score is based on a distance between the particular software project and a nearest non-outlier project in classification results for the anomalous static analysis rule for the particular software project; and automatically ranking the anomalous static analysis rules for the particular software project based on the respective score for each anomalous static analysis rule for the particular software project.

20. The computer program product of claim 19, wherein the operations further comprise:

automatically computing a respective alerts density score for each anomalous static analysis rule for the particular software project; and automatically filtering out the anomalous static analysis rules for the particular software project having an alerts density score that does not satisfy a threshold alerts density score.

21. The computer program product of claim 19, wherein the operations further comprise automatically filtering out the anomalous static analysis rules for the particular software project having an alerts density score that satisfies a threshold alerts density score.

22. The computer program product of claim 17, wherein the operations further comprise computing the threshold number of neighbors for the particular static analysis rule, comprising:

automatically computing a respective number of neighbors within the particular search radius for each different software project of the plurality of different software projects on which the particular static analysis rule was executed;

automatically ranking the plurality of different software projects on which the particular static analysis rule was executed according to the computed respective number of neighbors within the particular search radius; and automatically computing a value N for the threshold number of neighbors such that at least a threshold percentage of the plurality of different software projects have N or fewer neighbors.

23. The computer program product of claim 17, wherein the operations further comprise:

automatically generating an automatic notification of the anomalous static analysis rule; and automatically providing the automatic notification of the anomalous static analysis rule to a maintainer of the plurality of different static analysis rules for the static analysis system or to a developer of the particular software project.

24. The computer program product of claim 17, wherein the operations further comprise automatically disabling the particular static analysis rule.

* * * * *